Oct. 21, 1969    M. IVEC    3,474,410
SEQUENTIAL FLASHER

Filed April 11, 1967    2 Sheets-Sheet 1

Inventor
MARTIN IVEC.
BY
Mueller, Aichele & Rauner
ATTYS.

Oct. 21, 1969     M. IVEC     3,474,410
SEQUENTIAL FLASHER
Filed April 11, 1967     2 Sheets-Sheet 2
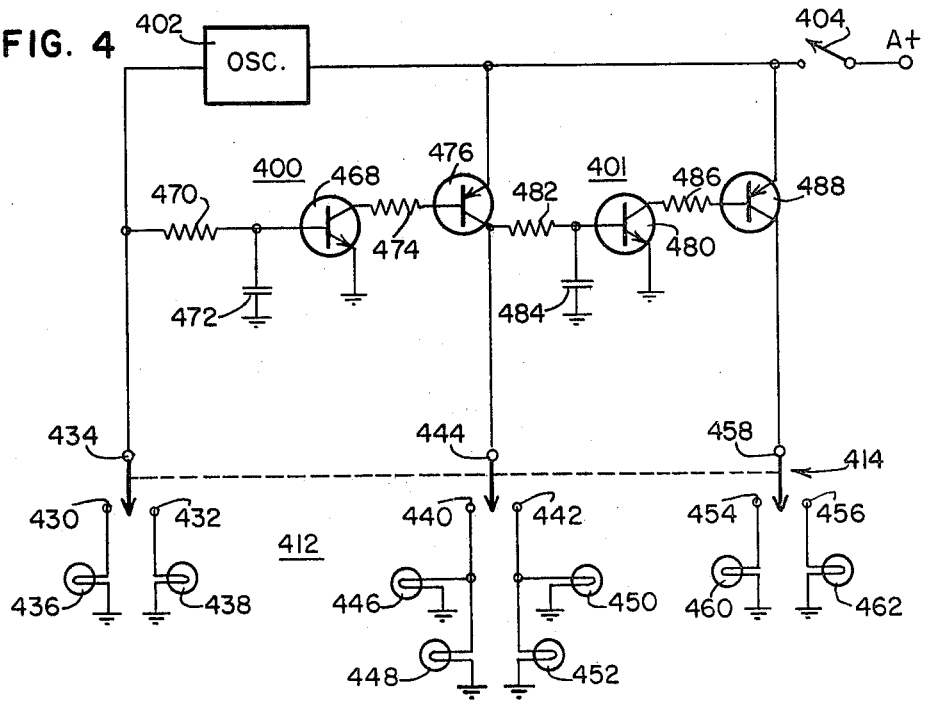
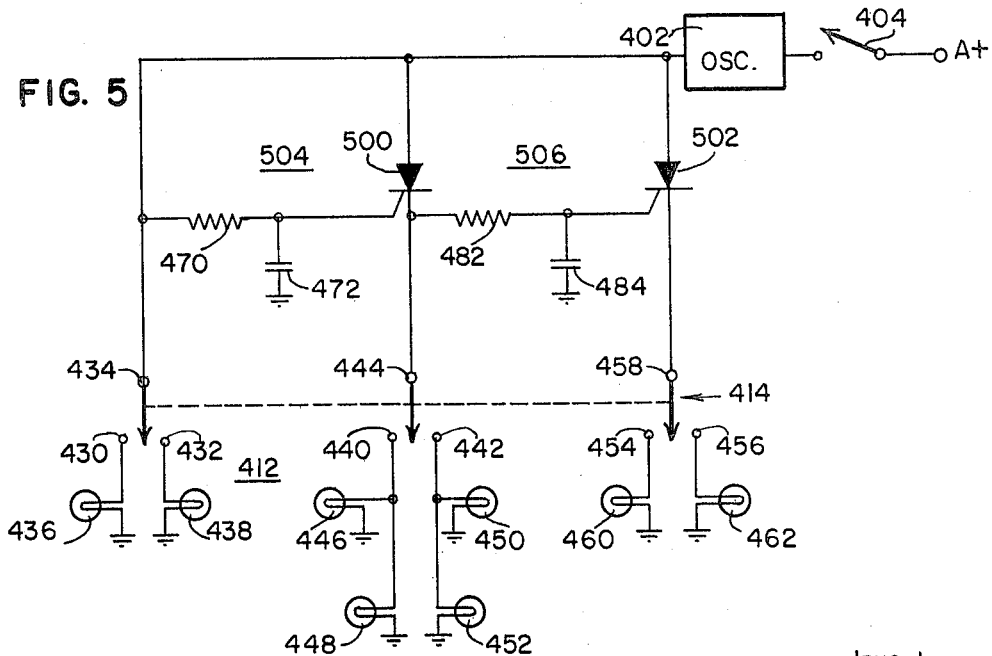
Inventor
MARTIN IVEC.
BY Mueller, Aichele & Rauner
ATTYS.

United States Patent Office 3,474,410
Patented Oct. 21, 1969

3,474,410
SEQUENTIAL FLASHER
Martin Ivec, Joliet, Ill., assignor to Motorola, Inc.,
Franklin Park, Ill., a corporation of Illinois
Filed Apr. 11, 1967, Ser. No. 630,076
Int. Cl. B60q 1/46
U.S. Cl. 340—82                                      5 Claims

ABSTRACT OF THE DISCLOSURE

A transistorized sequential flasher utilizing a sequence of identical sections, with each section including a resistance-capacitance network which, when energized by a timing oscillator upon closure of a ganged switch, charges to a predetermined level thereby turning on a two-stage amplifier. The amplifier output lights at least one lamp and initiates charging in the following section, thereby sequentially repeating the above operation in subsequent sections. The lamps in the sections light in sequence and remain lighted until the oscillator cycle is completed, at which time the lamps are extinguished for a predetermined time, then a new sequential flashing cycle begins.

BACKGROUND OF THE INVENTION

Turn indicator lamp systems of the sequential flashing type presently utilize mechanical devices, such as either a motor driven switch or thermo relays, to accomplish the sequential flashing. This type of system is susceptible to mechanical breakdown or failure because of the friction and wear of the moving parts. Also, the components are bulky and relatively expensive and in many cases consume a relatively a large amount of power.

SUMMARY OF THE INVENTION

An object of this invention is to provide an improved, compact, low cost sequential flasher unit.

Another object of this invention is to provide a transistorized sequential flasher unit which has no moving parts and consumes relatively little power.

A further object of this invention is to provide a sequential flasher unit which includes a self-contained transistorized master control flasher to control the timing of the flasher unit.

In one embodiment of this invention, the sequential flashing cycle is controlled by an oscillator or timing circuit. A potential is coupled to a first transistorized stage rendering it conductive. The conduction of the first transistorized stage lights at least one lamp and also couples a voltage to a resistor-capacitor charging network in a second transistorized stage which charges to a given voltage, thereby rendering the second transistorized circuit conductive. The conduction of the second transistorized stage lights at least one lamp and couples a voltage to a resistor-capacitor charging network in a third stage which, in turn, repeats the turn-on operation for the lamp or lamps connected to its output and also initiates conduction of the oscillator. The oscillator stops the sequential flashing operation by coupling a potential to the first transistorized stage, thereby causing the extinguishment of all the lamps for the duration of the sequential flashing cycle.

Figure 1:
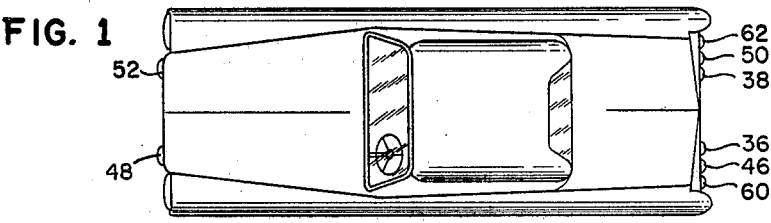
Figure 2:
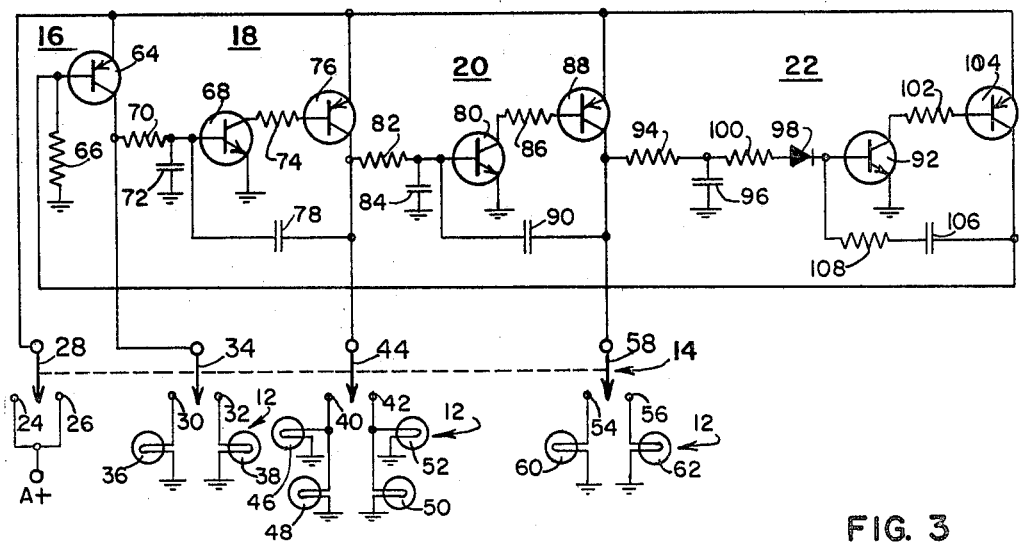
Figure 3:
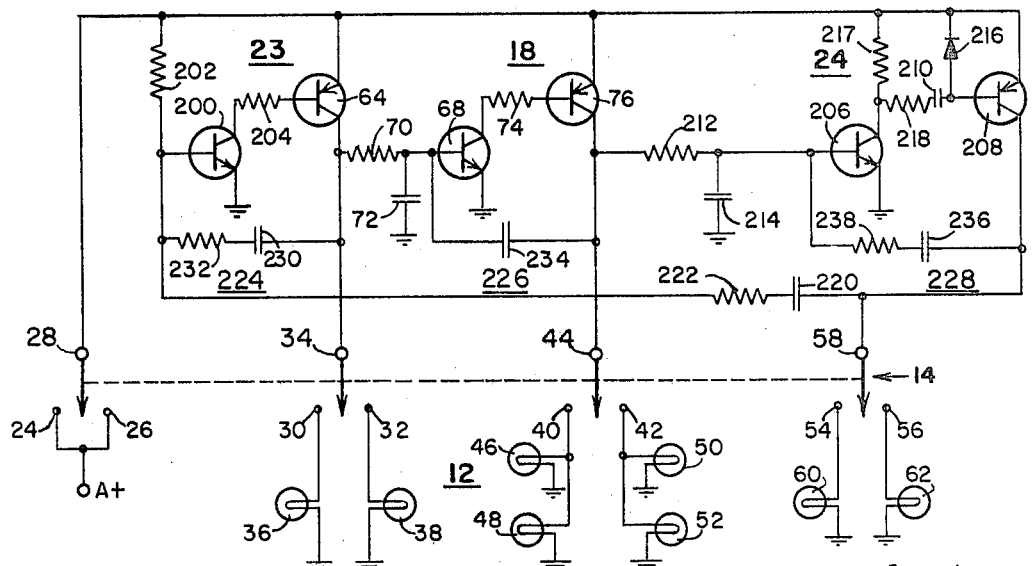

In the drawings:
FIG. 1 illustrates one device into which the invention can be incorporated;
FIG. 2 is a schematic circuit diagram of the invention;
FIG. 3 illustrates a modification of the embodiment illustrated in FIG. 1;
FIG. 4 is a schematic circuit diagram of a second embodiment of the invention; and
FIG. 5 is a schematic circuit diagram of a third embodiment of the invention.

DETAILED DESCRIPTION

Referring now to FIGS. 1 and 2, a circuit is shown which can be utilized as a sequential flashing circuit in the automobile of FIG. 1. Either a left hand or a right hand bank or group of electrical devices or lamps 12 can be sequentially flashed by activating the ganged turn indicator switch 14 which initiates action in input semiconductor switching circuit or stage 16, which is the stage which lights the rear innermost lamp on the desired side of the automobile. Semiconductor switching circuit or stage 18 lights the rear center lamp and the front or turn signal lamp on the desired side. Output semiconductor switching circuit or stage 20 lights the rear outermost lamp on the desired side. Stage 22 is an internal oscillator stage which is an integral part of the rest of the circuitry of FIG. 2. Stage 22 provides a feedback to stage 16 terminating the "on" portion of the cycle and providing timing for the "off" portion of the cycle.

Turn indicator switch 14 is a ganged switch having four sections with a first section consisting of stationary contacts 24 and 26 which are connected together and to the DC potential A+ and a movable contact 28. A second section is composed of stationary contacts 30 and 32 and movable contact 34. Left rear innermost lamp 36 is connected between stationary contact 30 and a reference potential or ground, while right rear innermost lamp 38 is connected between stationary contact 32 and the reference potential. A third section of the turn indicator switch 14 consists of stationary contacts 40 and 42 and movable contact 44. Left rear center lamp 46 is connected in parallel with left front or parking lamp 48 and between stationary contact 40 and the reference potential. Right rear center lamp 50 is connected in parallel with right front or parking lamp 52 and between stationary contact 42 and the reference potential. The last section of the turn indicator switch 14 is composed of stationary contacts 54 and 56 and movable contact 58. Left rear outermost lamp 60 is connected between stationary contact 54 and the reference potential, while right rear outermost lamp 62 is connected between stationary contact 56 and the reference potential.

Stage 16 includes PNP transistor 64 which has base, emitter and collector electrodes, with the emitter and collector electrodes, with the emitter and collector electrodes respectively connected to movable contacts 28 and 34. The base, or input terminal, is returned to the reference potential through resistor 66 in order to provide a DC return for forward biasing transistor 64.

Stage 18 includes NPN transistor 68 and PNP transistor 76 which have base, emitter and collector electrodes. A resistor-capacitor charging network or time base circuit composed of serially-connected resistor 70 and capacitor 72 is connected between the collector of transistor 64 and the reference potential. The base of transistor 68 is connected to the junction of resistor 70 and capacitor 72 for reception of the voltage charge across capacitor 72. The emitter is connected to the reference potential while the collector is connected through resistor 74 to the base electrode of transistor 76 to provide a turn-on signal to transistor 76. The emitter and collector electrodes of transistor 76 are respectively connected to movable contacts 28 and 44. Capacitor 78 is connected between the collector of transistor 76 and the base of transistor 68 to provide a regenerative feedback path for faster switching action of the transistors.

Output stage 20 is identical with stage 18 and includes NPN transistor 80 and PNP transistor 88 which have base, emitter and collector electrodes. The resistor-capacitor charging network or time base circuit in this stage is composed of serially-connected resistor 82 and capacitor 84 which are connected between the collector of transistor 76 and the reference potential. The base of transistor 80 is connected to the junction of resistor 82 and capacitor 84. The emitter of transistor 80 is connected to the reference potential while the collector is connected through resistor 86 to the base of transistor 88. The emitter and collector electrodes of transistor 88 are respectively connected to movable contacts 28 and 58 of turn indicator switch 14. Capacitor 84 controls the turn-on time of transistor 80 in the same manner that capacitor 72 controls the turn-on time of transistor 68. Capacitor 90 provides a regenerative feedback path from the collector, or output terminal of transistor 88 to the base of transistor 80 to provide sharper switching action for stage 20.

Oscillator stage 22 includes NPN transistor 92 and PNP transistor 104 which have base, emitter and collector electrodes. A resistor-capacitor charging network, composed of serially connected resistor 94 and capacitor 96, is connected between the collector or output terminal of transistor 88 and the reference potential. The base, or input circuit connection, of transistor 92 is connected through diode 98 and resistor 100 to the junction of resistor 94 and capacitor 96. Diode 98 isolates the charging network of resistor 94 and capacitor 96 from the base circuit of transistor 64, thereby preventing the premature charging of capacitor 96 through the base-emitter region of transistor 64 whenever transistor 64 is rendered conductive. The emitter of transistor 92 is connected to the reference potential while the collector is connected through resistor 102 to the base of transistor 104 to provide a turn-on signal thereto. The emitter and collector electrodes of transistor 104 are respectively connected to movable contact 28 and the base of transistor 64. The collector, or output circuit connection, of transistor 104 is also connected through capacitor 106 and resistor 108 to the base of transistor 92.

When transistor 92 and transistor 104 are rendered conductive, A+ is applied to the base of transistor 64 causing it to cut off, thereby cutting off all other lamp lighting stages. The series connection of capacitor charging components, capacitor 106 and resistor 108, provides a feedback from the collector of transistor 104 to the base of transistor 92 to lock these two stages on for a period of time, during which A+ is applied to the base of transistor 64, as explained above, keeping it cut off for the remainder of the cycle.

The circuit of FIG. 2 will operate in the following manner. When turn indicator switch 14 is placed in the left turn position, movable contacts 28, 34, 44 and 58 will respectively make contact with the stationary contacts 24, 30, 40 and 54. The A+ potential is then coupled through contacts 24 and 28 to the emitters of transistors 64, 76, 88 and 104. Since the base of transistor 64 in stage 16 is returned to ground potential through resistor 66 at this time, transistor 64 is forward biased and base current will flow to the reference potential through resistor 66 and the base-emitter region of transistor 64 from the A+ potential. Since the collector of transistor 64 is connected through contacts 34 and 30 to the ungrounded side of left rear innermost lamp 36, transistor 64 will now conduct and the collector will approach the A+ potential. Lamp 36 will consequently light.

At the same time that lamp 36 lights, capacitor 72 in stage 18, will start charging from the reference potential through resistor 70 to the collector potential of transistor 64. When capacitor 72 has charged to approximately 0.6 of a volt, the base-emitter region of transistor 68 will become forward biased. Transistor 68 will then start conducting to the reference potential through its emitter-collector region, resistor 74 and the base-emitter region of transistor 76 from the A+ potential. This renders transistor 76 conductive and its collector will approach the A+ potential thereby lighting lamps 46 and 48.

At the same time that lamps 46 and 48 light, capacitor 84 in stage 20 will start charging toward the A+ potential through resistor 82 and the collector-emitter region of transistor 76. When capacitor 84 has charged to approximately 0.6 of a volt, the base-emitter region of transistor 80 will become forward biased. The operation of the rest of the stage 20 is identical with the operation of stage 18, with the conduction of transistor 80 resulting in the conduction of transistor 88. When transistor 88 starts conducting its collector will go to almost the A+ potential and cause lamp 60 to light.

When lamp 60 lights, capacitor 96 in stage 22 will start charging up towards the A+ potential through resistor 94 and the collector-emitter region of transistor 88. When capacitor 96 has charged up to a voltage equal to the combined turn-on potentials of diode 98 and the base-emitter region of transistor 92, approximately one volt, the base-emitter region of transistor 92 will be forward biased and transistor 92 will start conducting to the reference potential through its emitter-collecter region, resistor 102 and the base-emitter region of transistor 104 from A+ potential, thereby forward biasing transistor 104. Transistor 104 will now start conducting and its collector potential will approach A+. Therefore, since the collector is also connected to the base of transistor 64, transistor 64 will be rendered non-conductive. As a result the collector of transistor 64 will return to the reference potential and lamp 36 will be immediately extinguished. At this time capacitor 72 will start discharging through lamp 36, contacts 30 and 34 and resistor 70. When the charge across the capacitor has decreased below approximately 0.6 of a volt, transistor 68 will begin to turn off thereby initiating turn-off of transistor 76. As the collector potential of transistor 76 drops, capacitor 78 begins to discharge through contacts 44 and 40 and through lamps 46 and 48, causing a negative potential to be applied to the base of transistor 68, cutting it off sharply, which in turn cuts off transistor 76. The turnoff operation of stage 20 is identical with the turnoff operation of stage 18. For all practical purposes all the lamps in the left bank, 36, 46, 48 and 60, will be extinguished at the same time. At the time transistor 88 is turned off, its collector returns to the reference potential and capacitor 96 will start discharging through lamp 60, contacts 54 and 58 and resistor 94. Capacitor 96 discharges below the combined turn off potentials of diode 98 and transistor 92 but the feedback network of capaiitor 106 and resistor 108 supplies sufficient current to the base of transistor 92 to keep it on and in turn transistor 104 on. Since the collector potential of transistor 104 is essentially at A+ and the base, or input terminal, of transistor 64 is connected to the collector, or output circuit connection, of transistor 104, transistor 64 is cut off until capacitor 106 charges up to a point that the base of transistor 92 has insufficient current to sustain saturation. At this time transistor 92 begins to pull out of saturation as does transistor 104. This causes the collector potential of transistor 104 to begin to return towards the reference potential. When this happens capacitor 106 starts to discharge through resistor 66 and a negative potential is applied to the base of transistor 92 cutting it off immediately. In turn transistor 104 is also cut off and the collector of transistor 104 returns to reference potential with the discharge of capacitor 106. As this happens, transistor 64 becomes forward biased and the cycle will be repeated.

The operation of the sequential flasher in the right turn position of turn indicator switch 14 is identical with the operation in the left turn position, with the exception that the lamps connected to stationary contacts 32, 42 and 56 are sequentially flashed. When turn indicator switch 14 returns, or is returned to its center position, sequential flashing operation ceases, since neither the A+ potential nor the lamps are connected to the stages.

The frequency of operation of the sequential flashing circuit of FIG. 2 is approximately 80 cycles per minute. It is desirous that the duty cycle be approximately 60%. Therefore, the values of the various resistance-capacitance charging networks are chosen such that lamp 36 is lighted 60% of the time, lamps 46 and 48 are lighted 40% of the time, lamp 60 is lighted 20% of the time, and all of the lamps are extinguished during the remaining 40% of the time.

Typical values for the circuit of FIG. 2 are as follows:

Transistors:
| | |
|---|---|
| 64, 76, 88 | 2N176 |
| 68, 80, 92 | 2N3567 |
| 104 | EL260 (Motorola) |

Lamps:
| | |
|---|---|
| 36, 38, 46, 48, 50, 52, 60, 62 | 1034 |

Capacitors:
| | | |
|---|---|---|
| 78, 90 | microfarads | 5 |
| 106 | do | 100 |
| 72, 84, 96 | do | 200 |

Resistors:
| | | |
|---|---|---|
| 66 | ohms | 180 |
| 70, 94 | do | 39K |
| 74, 86 | do | 56 |
| 82 | do | 56K |
| 100 | do | 5.6K |
| 102 | do | 220 |
| 108 | do | 6.8K |

In the circuit of FIG. 3, the sequential flashing operation is accomplished with one less transistor circuit than that used in the circuit of FIG. 2. Equivalent components are given the same numeral designation as in FIG. 2. The essential differences in the structure of the circuit will now be pointed out. In stage 23, NPN transistor 200, having base, emitter and collector electrodes, has its emitter returned to the reference potential and its base connected through resistor 202 to movable contact 28 on turn indicator switch 14. The collector of transistor 200 is connected through resistor 204 to the base of transistor 64 to furnish a turn-on voltage thereto upon activation of turn indicator switch 14. The connections for stage 18 are identical with the connections for stage 18 in FIG. 2, with the exception that the collector of transistor 76 is connected to the timing circuit 24. Timing circuit 24 includes NPN transistor 206 and PNP transistor 208, both having base, emitter and collector electrodes. A resistance-capacitance charging network, composed of serially connected resistor 212 and capacitor 214, is connected between the collector of transistor 76 and the reference potential. The emitter of transistor 206 is connected to the reference potential while the base is connected to the junction of resistor 212 and capacitor 214. The collector of transistor 206 is connected through resistor 218 and capacitor 210 to the base of transistor 208 in order to provide a turn-on potential thereto. Diode 216 is connected between the junction of capacitor 210 and the base of transistor 208 to movable contact 28 to provide a discharge path for capacitor 210. Also connected to the collector of transistor 206 is resistor 217 which connects to movable contact 28 and provides A+ to capacitor 210 on the off cycle enabling it to discharge. The emitter and collector electrodes of transistor 208 are respectively connected to movable contacts 28 and 58 of turn indicator switch 14. The collector of transistor 208 is further connected through capacitor 220 and resistor 222 to the base of transistor 200 to provide a feedback path thereto in order to control the sequential flashing operation of the circuit, i.e., turn it off at end of cycle.

Also connected to the collectors of transistors 64, 76 and 208 from the bases of transistors 200, 68 and 206 respectively are feedback networks 224, 226 and 228. Feedback networks 224, 226 and 228 are respectively composed of capacitor 30 and resistor 232, capacitor 234, and capacitor 236 and resistor 238, and serve to provide a fast switching action between conducting and non-conducting states, as explained in conjunction with the circuit of FIG. 2.

In operation, the circuit of FIG. 3 is quite similar to that of FIG. 2. When, for example, the turn indicator switch 14 is moved to the left turn position, movable contacts 28, 34, 44 and 58 respectively make contact with stationary contacts 24, 30, 40 and 54. The A+ potential is coupled to the emitters of transistors 64, 76 and 208 and resistor 217 and through resistor 202 to the base of transistor 200, thereby turning on transistor 200. The conduction of transistor 200 through resistor 204 and the base-emitter region of 64 turns on transistor 64 and causes lamp 36 to light. In addition, the potential at the collector of transistor 64 also provides the charging potential for the charging network in stage 18 which is composed of resistor 70 and capacitor 72. The operation of stage 18 is identical with the operation of stage 18 in the circuit of FIG. 2. When capacitor 72 has charged up to approximately 0.6 of a volt, transistor 68 starts conducting and thereby renders transistor 76 conductive. The collector of transistor 76 goes to approximately the A+ potential and causes lamps 46 and 48 to light.

The collector potential of transistor 76 furnishes a charging voltage for the charging network in stage 24. This network charges to ground through capacitor 214, resistor 212, and the collector-emitter region of transistor 76 from the A+ potential. When capacitor 214 has charged to a voltage of approximately 0.6 of a volt, transistor 206 is sufficiently forward biased to conduct through its emitter-collector region, resistor 218, capacitor 210 and the base-emitter region of transistor 208, thereby turning on transistor 208. The conduction of transistor 208 causes its collector to go to approximately the A+ potential, thereby lighting lamp 60. At this time transistors 206 and 208 are conducting at saturation and all of the lamps on the left side or bank are lighted. Also at this time capacitor 220 starts charging from A+ through the emitter collector region of transistor 208, resistor 222 and the base-emitter region of transistor 200 toward the A+ potential. At the same time that capacitor 220 is charging, capacitor 210 is charging from A+ through the emitter to base region of transistor 208, through resistor 218 and the collector emitter region of transistor 206. As the capacitor 210 charges, the base current of transistor 208 decreases causing transistor 208 to go out of saturation. The collector of transistor 208 therefore goes less positive. When this happens capacitor 220 stops charging, as previously stated, and immediately starts discharging through lamp 60, thereby also placing a negative potential on the base of transistor 200. This causes transistor 200 to cut off rapidly and also cuts off transistor 64. This effect is felt down the line to transistors 68, 76, 206 and 208, and by the process of degeneration all the transistors are rapidly cut off. Also aiding in the cutoff are each of the speed up networks which act in the same manner as resistor 222 and capacitor 220 act on the whole system. When the transistors are cut off, the collector potential of transistor 206 rises toward A+ causing capacitor 210 to discharge through diode 216, through A+, resistor 217 and resistor 218. Capacitor 220 also continues to discharge through lamp 60, A+, resistor 202, and resistor 222. After capacitor 220 has completely discharged, it will start charging toward the A+ potential. When the charge across capacitor 220 reaches approximately a positive 0.6 volt, transistor 200 will start conducting and another sequential flashing cycle will begin.

The identical operation takes place when the turn indicator switch 14 is placed in the right turn position, with the exception that stationary contacts 32, 42 and 56 are respectively connected to movable contacts 34, 44 and 58, so that the lamps connected to those stationary contacts will be sequentially flashed.

The frequency and duty cycle of the sequential flashing operation is similar to that of the circuit of FIG. 2.

The circuit in FIG. 4 is designed to be used with an external oscillator or timing circuit. A high quality thermo-flasher with a long duty cycle may be utilized for the external oscillator 402, or a solid state external oscillator could be used. The principle object of the external oscillator is to provide a square wave having a duty cycle of at least 60%. The equivalent components are given the same or equivalent reference numerals of those in the circuit of FIG. 2.

In operation, when ignition switch 404 is closed and turn indicator switch 414, which is a ganged three section switch, is placed in the left turn position, movable contacts 434, 444 and 458 make contact with stationary contacts 430, 440 and 455. At this time the external oscillator or timing circuit 402 starts producing positive square waves in which the duty cycle is approximately 60% in duration. The positive wave is applied to movable contact 434 and immediately lights lamp 436. At the same time capacitor 472 charges through resistor 470 to this positive potential, as was explained previously. The operation of the rest of the circuit is similar with the operation of stages 18 and 20 as explained in connection with the circuit of FIG. 2, with the lamp 436 lighting first and remaining lighted for 60% of the time, lamps 446 and 448 lighting next and remaining lighted for 40% of the time, and lamp 460 lighting last and remaining lighted for 20% of the time, and all lamps being extinguished during the remaining 40% of the time by the removal of the positive wave from the external oscillator.

The circuit of FIG. 5 is identical with that of FIG. 4 with the exception that silicon controlled rectifiers 500 and 502 are respectively utilized in place of the switching circuits composed of transistors 468 and 476, and transistors 480 and 488. The anodes of silicon controlled rectifiers 500 and 502 are connected together and to the output side of external oscillator 402, the cathodes are respectively connected to movable contacts 444 and 458, and the control electrodes are respectively connected to the junction of resistors 470 and capacitor 472 in stage 504 and the junction of resistor 482 and capacitor 484 in stage 506.

In operation, when ignition switch 404 is closed and turn indicator switch 414 is placed in the left turn position, for example, external oscillator 402 produces a positive square wave as discussed in connection with the circuit of FIG. 4. Lamp 436 immediately lights and capacitor 472 charges from the external oscillator to the reference potential through resistor 470. When capacitor 472 has charged up sufficiently to gate on the silicon controlled rectifier 500, rectifier 500 will conduct through the parallel combination of lamps 446 and 448, thereby lighting them. Also, since the cathode of rectifier 500 is almost at the output potential of oscillator 402, it will furnish a charging voltage to the charging network composed of resistor 482 and capacitor 484, and the identical operation will ensue in stage 506 that ensued in stage 504. Consequently, silicon controlled rectifier 502 will be gated on by the charge on capacitor 484 and its cathode will go to approximately the output potential of the external oscillator 402. Lamp 460 will therefore light. The lamps on the left side or bank, lamps 436, 446, 448 and 460 will remain lighted until the external oscillator has completed its duty cycle, at which time the lamps will be extinguished by the ensuing zero output of the external oscillator. It should be obvious that the same operation will ensue if turn indicator switch 414 is placed in the right turn position with the only exception being that the output of the external output would be coupled to stationary contacts 432, 442 and 456, thereby sequentially lighting the lamps on the right hand side.

Applicant has provided an improved, noiseless semiconductor sequential flasher unit which requires no moving parts and consumes relatively little power and, in addition, can be utilized with either an external or an internal master control flasher in order to control the timing of the sequential flashing operation.

I claim:

1. A circuit for sequentially operating a plurality of lamp loads used in an indicator system for a vehicle, including in combination, a plurality of semiconductor switching stages, each of said stages being connected to a respective lamp load, time base circuit means coupled between each of said stages, each said time base circuit means being associated with a prior stage to energize a subsequent stage, switch means coupled to the first one of said semiconductor switching stages, said switch means being selectively operated to initially energize said first stage including the lamp load thereof and associated time base circuit means, each subsequent stage being energized by the operation of said time base circuit means of the prior stage, and control circuit means connected between the last one of said semiconductor switching stages and the first one thereof, said control circuit means being actuated with the last lamp load being energized to initiate an output signal of a predetermined duration thereby disabling the lamp loads of all said stages for said duration, and with said control circuit means being de-actuated at the end of the predetermined duration, said switch means re-initiating the sequential operation of the lamp loads.

2. The circuit of claim 1 wherein said first semiconductor switching stage includes a transistor having a control electrode, said switch means includes a manually operable switch connected to said transistor for applying a potential thereto to energize the same, and said control circuit means includes transistor switch means comprising feedback circuit means for sustaining conduction thereof for a predetermined time with the same being energized, said transistor switch means having an input connected to the last semiconductor switching stage and an output connected to said control electrode of the first semiconductor switching stage, said transistor switch means being responsive to the energizing of the last semiconductor switching stage to apply a potential to said control electrode of said first semiconductor switching stage thereby de-energizing that stage and subsequent stages, and said feedback circuit means sustaining the output of said transistor switch means for a predetermined time to establish the off time of the lamp loads.

3. The circuit of claim 2 wherein said transistor switch means further includes, first and second transistors, each having input, output and control electrodes, said control electrode of said first transistor being connected to the output of the last semiconductor switching stage, and said input electrode thereof being connected to the control electrode of said second transistor, with the output electrode of said second transistor being connected to the control electrode of said transistor in said first semiconductor switching stage, and wherein said feedback circuit means includes a resistance-capacitance circuit connected between the output electrode of said second transistor and the control electrode of said first transistor to sustain operation of said transistor switch means for a period dependent on the time constant of the resistance-capacitance circuit.

4. The circuit of claim 1 wherein said first semiconductor switching stage includes a transistor having a control electrode, said switch means includes a manually operable switch for coupling a potential to said transistor for energizing the same, and said control circuit means includes first resistor-capacitor circuit means connected between the output of the last semiconductor switching stage and the control electrode of said transistor of said first semiconductor switching stage, and the circuit further including said last semiconductor switching stage having circuit means for determining the duration of conduction thereof, so that with the last lamp load being energized said last semiconductor switching stage conducts for a time determined by said circuit means, and said first resistor-capacitor circuit means being responsive to said last semiconductor switching stage being de-energized to provide a potential to deenergize said first semiconductor switching stage and all subsequent stages for a predetermined time after which said manually operable switch re-initiates the sequential operation of the circuit.

5. The circuit of claim 4 wherein said last semiconductor switching stage includes first and second transistors having input, output and control electrodes, said control electrode of said first transistor being connected to said time base circuit means associated with the prior stage, and wherein said control means for determining the duration of conduction thereof includes second resistor-capacitor circuit means connected between the input electrode of said first transistor and the control electrode of said second transistor, said capacitor being charged with conduction of said second transistor to apply a bias potential to the control electrode thereof to de-energize the same, and wherein said first resistor-capacitor circuit means is connected between the output electrode of said second transistor and the control electrode of said transistor in said first semiconductor switching stage, said first resistor-capacitor circuit means being responsive to said last semiconductor switching stage being de-energized to apply a bias potential to the control electrode of said transistor of said first semiconductor switching stage to de-energize the same and all subsequent stages for a predetermined time after which said manually operable switch re-initiates sequential operation of the circuit.

References Cited

UNITED STATES PATENTS

| | | | |
|---|---|---|---|
| 2,797,367 | 6/1957 | Scott et al. | 340—82 X |
| 2,912,675 | 11/1959 | Habsburg-Lothringen et al. | 340—82 X |
| 3,034,017 | 5/1962 | Larsen et al. | 340—331 X |
| 3,113,293 | 12/1963 | Breese et al. | 340—83 X |
| 3,251,030 | 5/1966 | Bolton et al. | 340—41 |
| 3,313,981 | 4/1967 | Kratochvil | 315—210 |
| 3,315,227 | 4/1967 | Du Rocher | 340—82 |
| 3,376,472 | 4/1968 | Taylor et al. | 340—83 X |

JOHN W. CALDWELL, Primary Examiner

K. N. LEIMER, Assistant Examiner

U.S. Cl. X.R.

315—317, 323